US010948004B2

(12) United States Patent
Auffinger et al.

(10) Patent No.: US 10,948,004 B2
(45) Date of Patent: Mar. 16, 2021

(54) ANCHORING BOLT HEAD FOR AN EME PROTECTION CAP SYSTEM

(71) Applicant: THE BOEING COMPANY, Chicago, IL (US)

(72) Inventors: Sean Auffinger, Ladson, SC (US); Bart Stevens, Summerville, SC (US); Brandon Mulligan, Charleston, SC (US); Daniel J. Cowan, North Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 171 days.

(21) Appl. No.: 16/046,316

(22) Filed: Jul. 26, 2018

(65) Prior Publication Data
US 2020/0032834 A1 Jan. 30, 2020

(51) Int. Cl.
F16B 37/14 (2006.01)
F16B 33/00 (2006.01)
F16B 39/02 (2006.01)
B64D 45/02 (2006.01)

(52) U.S. Cl.
CPC ............ F16B 37/14 (2013.01); F16B 33/004 (2013.01); F16B 39/021 (2013.01); B64D 45/02 (2013.01)

(58) Field of Classification Search
CPC ...... F16B 33/004; F16B 37/14; F16B 37/125; F16B 39/021; B64D 45/02; Y10S 411/91
USPC ............................. 411/372.5, 372.6, 373, 374
See application file for complete search history.

(56) References Cited

U.S. PATENT DOCUMENTS

| 1,368,637 | A |   | 2/1921  | McFarland   |          |
|-----------|---|---|---------|-------------|----------|
| 1,868,084 | A | * | 7/1932  | Wheelwright | F22B 7/16 |
|           |   |   |         |             | 411/374  |
| 2,020,522 | A | * | 11/1935 | Seguin      | F16B 37/14 |
|           |   |   |         |             | 411/374  |
| 3,699,368 | A |   | 10/1972 | Palmer      |          |
| 4,013,190 | A |   | 3/1977  | Wiggins et al. |       |

(Continued)

FOREIGN PATENT DOCUMENTS

CA 2856687 A1 3/2015
CA 2858461 A1 3/2015
(Continued)

OTHER PUBLICATIONS http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.

(Continued)

Primary Examiner — Roberta S Delisle
(74) Attorney, Agent, or Firm — Marshall, Gerstein & Borun LLP

(57) ABSTRACT

A cap system for enclosing a metallic bolt fastener extending through a structure which includes a first securement mechanism positioned about a periphery of a bolt head of the metallic bolt fastener. The cap system further includes a cap member which includes a sidewall having an inner surface which defines a cavity dimensioned to receive the bolt head and defines a second securement mechanism complementary configured to engage the first securement mechanism positioned about the periphery of the bolt head. The cap system further includes an end of the sidewall of the cap member which defines an opening which provides the bolt head access into the cavity.

20 Claims, 16 Drawing Sheets

(56) References Cited

U.S. PATENT DOCUMENTS

| | | | |
|---|---|---|---|
| 4,295,766 A | 10/1981 | Shaw | |
| 4,519,974 A | 5/1985 | Bravenec et al. | |
| 4,630,168 A | 12/1986 | Hunt | |
| 4,636,446 A | 1/1987 | Lee | |
| 4,723,866 A * | 2/1988 | McCauley | E02D 29/1427 404/25 |
| 4,826,380 A | 5/1989 | Henry | |
| 4,850,778 A | 7/1989 | Clough et al. | |
| 4,884,933 A | 10/1989 | Preusker et al. | |
| 5,108,853 A | 4/1992 | Feres | |
| 5,181,817 A * | 1/1993 | Anderson | F16B 5/025 411/369 |
| 5,350,266 A | 9/1994 | Espey et al. | |
| 5,752,794 A * | 5/1998 | Krawczak | B60B 7/14 301/108.4 |
| 6,053,683 A * | 4/2000 | Cabiran | F16B 37/14 411/372.6 |
| 6,102,128 A | 8/2000 | Bridgeman | |
| 6,318,942 B1 * | 11/2001 | Wieczorek | F16B 37/14 411/374 |
| 7,134,666 B2 | 11/2006 | Beyssac et al. | |
| 7,755,876 B2 | 7/2010 | Morrill et al. | |
| 7,918,081 B2 | 4/2011 | Schlichting et al. | |
| 7,936,550 B2 | 5/2011 | Morrill et al. | |
| 8,318,942 B2 | 11/2012 | Zhang | |
| 8,388,293 B2 | 3/2013 | Hutter, III | |
| 8,711,541 B2 | 4/2014 | Umemoto et al. | |
| 8,717,735 B2 | 5/2014 | Day et al. | |
| 8,717,736 B2 | 5/2014 | Asahara et al. | |
| 8,840,740 B2 | 9/2014 | Rorabaugh et al. | |
| 8,894,338 B2 | 11/2014 | Dobbin et al. | |
| 9,133,874 B2 | 9/2015 | Hill | |
| 9,188,226 B2 | 11/2015 | Pajel et al. | |
| 9,228,604 B2 | 1/2016 | Dobbin | |
| 10,151,337 B2 | 12/2018 | Hill | |
| 2002/0192052 A1 | 12/2002 | Ruspa | |
| 2008/0137259 A1 | 6/2008 | Heeter et al. | |
| 2009/0194297 A1 | 8/2009 | Ortiz Teruel | |
| 2010/0303582 A1 | 12/2010 | Choi et al. | |
| 2012/0217673 A1 | 8/2012 | Hutter, III | |
| 2013/0206759 A1 | 8/2013 | Wurz et al. | |
| 2013/0223951 A1 | 8/2013 | Bessho et al. | |
| 2014/0048198 A1 | 2/2014 | Dobbin et al. | |
| 2014/0261956 A1 | 9/2014 | Wiseman et al. | |
| 2014/0341675 A1 | 11/2014 | Dobbin | |
| 2015/0060465 A1 | 3/2015 | Limbacher et al. | |
| 2015/0082603 A1 | 3/2015 | Rawdon et al. | |
| 2015/0086295 A1 | 3/2015 | Cameron et al. | |
| 2015/0184688 A1 | 7/2015 | Dobbin et al. | |
| 2015/0345533 A1 * | 12/2015 | Hill | F16B 35/00 411/374 |
| 2016/0131179 A1 | 5/2016 | Prouty et al. | |
| 2017/0021209 A1 | 1/2017 | Damazo et al. | |

FOREIGN PATENT DOCUMENTS

| | | |
|---|---|---|
| DE | 1085586 B | 7/1960 |
| EP | 2610506 A1 | 7/2013 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015025130 A1 | 2/2015 |

OTHER PUBLICATIONS http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Bart Stevens et al., U.S. Appl. No. 15/960,835, filed Apr. 24, 2018.
Toulouse, Mixed Metal-Composite Assembly, May 2013.
Boeing Proprietary, Zap Caps as Alternative to Seal Caps—Task No. 17728-01, dated Aug. 19, 2016, 30 pages.
Boeing Proprietary, Zap Cap Further Screening Test Plan for 787 Fuel Tank Use, Mar. 24, 2016, 24 pages.
Hutchinson Proprietary Document, Accessories: TP Nutcaps, 1 page.
Sean Auffinger et al., U.S. Appl. No. 16/046,316, filed Jul. 26, 2018.
Novaria/ESNA Design, dated Jul. 14, 2017, 3 pgs.
Boeing Part Standard, BACC50AP, dated Feb. 2, 2017, 16 pgs.
Click Bond Cap dated May 16, 2016, 4 pgs.
Extended European Search Report for EP Application No. 18196707.6 dated Feb. 19, 2019.
EP Search Report for Application No. EP14175808 dated Mar. 6, 2015.
PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
Extended EP Search Report for EP Application No. 19204019.4 dated Mar. 30, 2020.
Written Opinion for EP Application No. 19204019.4 dated Mar. 30, 2020.
European Search Report for EP Application No. EP19217717 dated May 8, 2020.
European Search Report for Application No. 19179944.4 dated Sep. 10, 2019.
Communication Pursuant to Article 94(3) dated Oct. 16, 2019.
Novaria/ESNA Design, dated Jul. 14, 2017, 3 pgs (Under Seal).

(56) References Cited

OTHER PUBLICATIONS

Extended EP Search Report for EP Application No. 19207962.2 dated Mar. 26, 2020.
EP Search Report for EP Application No. EP19166688 dated Aug. 29, 2019.
EP Office Action for EP Application No. 19166688.2 dated Sep. 20, 2019.
EP Search Report for EP Application No. EP19167831 dated Aug. 21, 2019.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
Extended European Search Report for EP Application No. 20176033.7 dated Oct. 23, 2020.

* cited by examiner

US 10,948,004 B2

ANCHORING BOLT HEAD FOR AN EME PROTECTION CAP SYSTEM

FIELD

This disclosure relates to an electrical insulation cap assembly for insulating metallic fasteners from transmitting current or sparks into the vicinity of the location of the metallic fastener with an occurrence of electromagnetic effect ("EME") or lightning strike event and more particularly for electrical insulating containment caps which enclose a metallic threaded fastener background.

BACKGROUND

Electrically insulated sealant and containment caps have been used to cover an end portion of a metallic fastener assembly which includes a bolt head and a threaded end portion of a shaft or stud which extends beyond the bolt head and which may include one or more washers. The sealant caps electrically insulate the end portion of the metallic fastener assembly so as to electrically isolate and contain the end portion of the metallic fastener assembly from critical surroundings of the metallic fastener assembly such as within a vicinity of a fuel tank or sensitive electronic equipment within an aircraft. Electrically isolating and containing the end portion of the metallic fastener assembly prevents unwanted sparks or electrical current transmissions entering into such important surroundings upon an EME or lightning strike event.

The insulation and containment caps are made from sealant material such as for example a thermoset plastic. The caps are also filled with a liquid form of sealant material. Once the cap is filled with liquid sealant, the cap is positioned over the end portion of the metallic fastener assembly enclosing the end portion of the metallic fastener assembly within the cap and a surface of a structure from which the end portion of the metallic fastener assembly extends. At times sealant is expelled from the cap being over filled with sealant. This expelling of sealant can also occur by way of a sufficient amount of sealant being present such that expelling of some sealant from the cap can occur which indicates an adequate amount of sealant has been used. The expelled sealant in either occurrence must then be smoothed out about the cap to ensure proper sealing of the cap and for aesthetics. This smoothing out process is tedious and time consuming.

The cap also requires being held in place for a time period so as to maintain the cap's position to prevent an occurrence of the cap experiencing slumping or lifting off of the surface of a structure from which the end portion of the metallic fastener assembly extends during the curing of the sealant. The cap-to-structure joints are subject to high quality standards and often require rework.

There is a need to reduce the time to install EME or lightning strike event protective caps enclosing end portions of metallic fastener assemblies in high criticality areas such as in the proximity of fuel tanks or sensitive electronic equipment of an aircraft. In addition there is a need to have a reliable securement mechanism for securing the caps to the end portions of the metallic fasteners.

SUMMARY

An example includes a cap system for enclosing a metallic bolt fastener extending through a structure which includes a first securement mechanism positioned about a periphery of a bolt head of the metallic bolt fastener. The cap system further includes a cap member which includes a sidewall having an inner surface which defines a cavity dimensioned to receive the bolt head and defines a second securement mechanism complementary configured to engage the first securement mechanism positioned about the periphery of the bolt head. The cap system further includes an end of the sidewall of the cap member which defines an opening which provides the bolt head access into the cavity.

The features, functions, and advantages that have been discussed can be achieved independently in various embodiments or may be combined in yet other embodiments further details of which can be seen with reference to the following description and drawings.

DESCRIPTION

Figure 1:
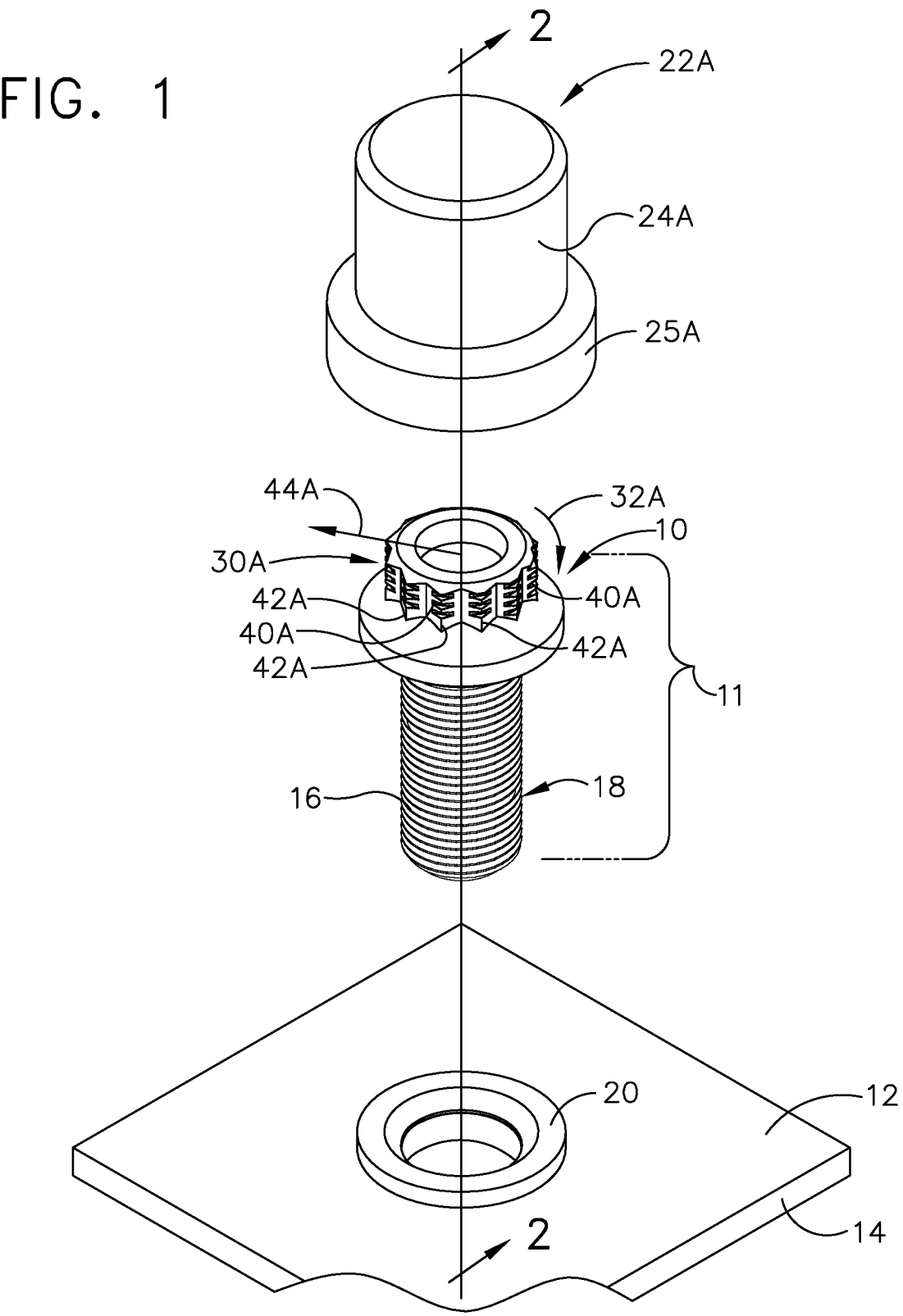
FIG. 1 is an exploded perspective view of a first embodiment of a cap system for enclosing a bolt head end of a metallic fastener extending from a structure.

A cap system described herein will be employed to enclose a bolt head of a metallic bolt fastener which is secured to a structure such as a structure positioned within an aircraft. The cap system has a cap member. The cap member is to be positioned over and enclose the bolt head which extends from the structure and secures to the bolt head. With an end of the cap member positioned abutting a surface of the structure, the bolt head of the metallic bolt fastener is enclosed within the confines of the cap member and the surface of the structure. With positioning the cap member to enclose the bolt head of the bolt fastener, the cap member secures to the bolt head.

The cap is constructed of a nonconductive material such as a polymer, thermoset or of other nonconductive material. A nonconductive sealant material may be additionally used within the cap member to further electrically isolate the bolt head of the metallic bolt fastener positioned within the cap member from the surrounding vicinity positioned outside of the cap member. Surrounding vicinities within an aircraft which would need electrical transmission isolation from a metallic bolt fastener include areas such as a fuel tank, areas which contain sensitive electronic equipment or areas which could otherwise be adversely affected by a transmission from an EME or lightning strike event such as experienced by an aircraft.

A metallic bolt fastener includes a bolt head and a threaded shaft portion. In employing the metallic bolt fastener, the threaded shaft portion is positioned to extend through a hole defined by and through the structure. The structure may include two or more components that will need to be secured together and the threaded shaft extends through the structure with a portion of the threaded shaft extending out of the hole and in a direction away from the structure. The head of the bolt extends from an opposite side of the structure in a direction away from the structure and the threaded shaft. The metallic bolt fastener is secured to the structure with typically a nut member, which has threads compatible to the threads of the threaded shaft. The nut is engaged onto the threaded shaft and is tightened against the structure such that the bolt head and the nut apply a compressive force onto the structure and the bolt head is in a secured position with respect to the structure. With positioning the bolt head in the secured position, washer(s) may be positioned between the bolt head and the structure and similarly with the nut positioned applying a compressive force to the structure with the bolt head, washer(s) may also be positioned between the nut and the structure. With the bolt head of the metallic bolt fastener in a secured position with respect to the structure and with a cap member of the cap system enclosing the bolt head, along with any washer (s) which may be used in association the bolt head, the cap member at the same time will secure to the bolt head and the cap member will be positioned against the structure.

Figure 2:
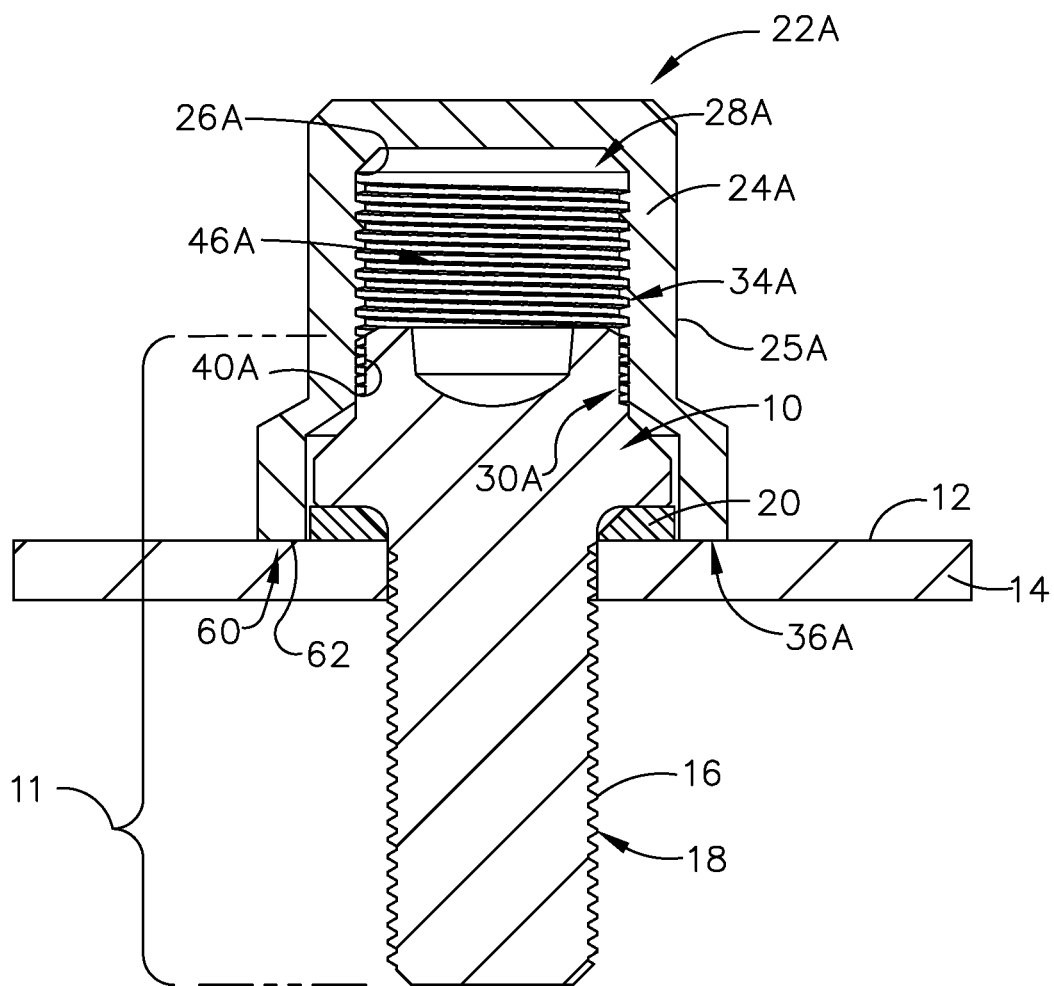
FIG. 2 is a cross section view along line 2-2 of FIG. 1 of the first embodiment of the cap system assembled with the enclosing the bolt head end of the metallic fastener.

In referring to FIGS. 1 and 2, in this example, bolt head 10 of metallic bolt fastener 11 is shown projecting from surface 12 of structure 14. Structure 14 is shown schematically wherein structure 14 may include one or more components to which metallic bolt fastener 11 is secured. Metallic bolt fastener 11 in this example includes threaded shaft 16 having threads 18. In this example, washer 20 is positioned surrounding metallic bolt fastener 11 and is positioned between bolt head 10 and surface 12. In referring to FIG. 2, a nut (not shown) which has compatible threads with threads 18 of threaded shaft 16 of metallic bolt fastener 11 can be tightened against structure 14 resulting in the nut and bolt head 10 exerting a compressive force with respect to structure 14 obtaining a secured positioned of bolt head 10 with respect to structure 14. In this example, washer 20 is positioned between bolt head 10 and structure 14. Similarly a washer may be positioned as needed between nut (not shown) and structure 14 as well.

Figure 3:
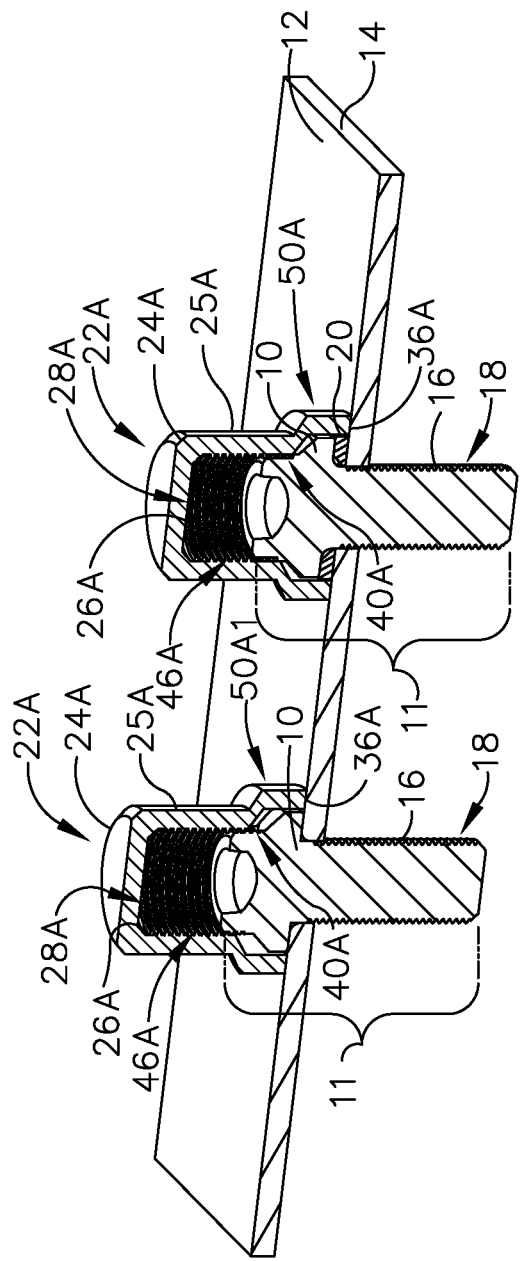
FIG. 3 is a perspective cross section view of employment of the first embodiment of the cap system of FIG. 1 assembled wherein a first example has a washer positioned between the bolt head and the structure and the second example has the bolt head positioned on a surface of the structure without a washer.
Figure 4:
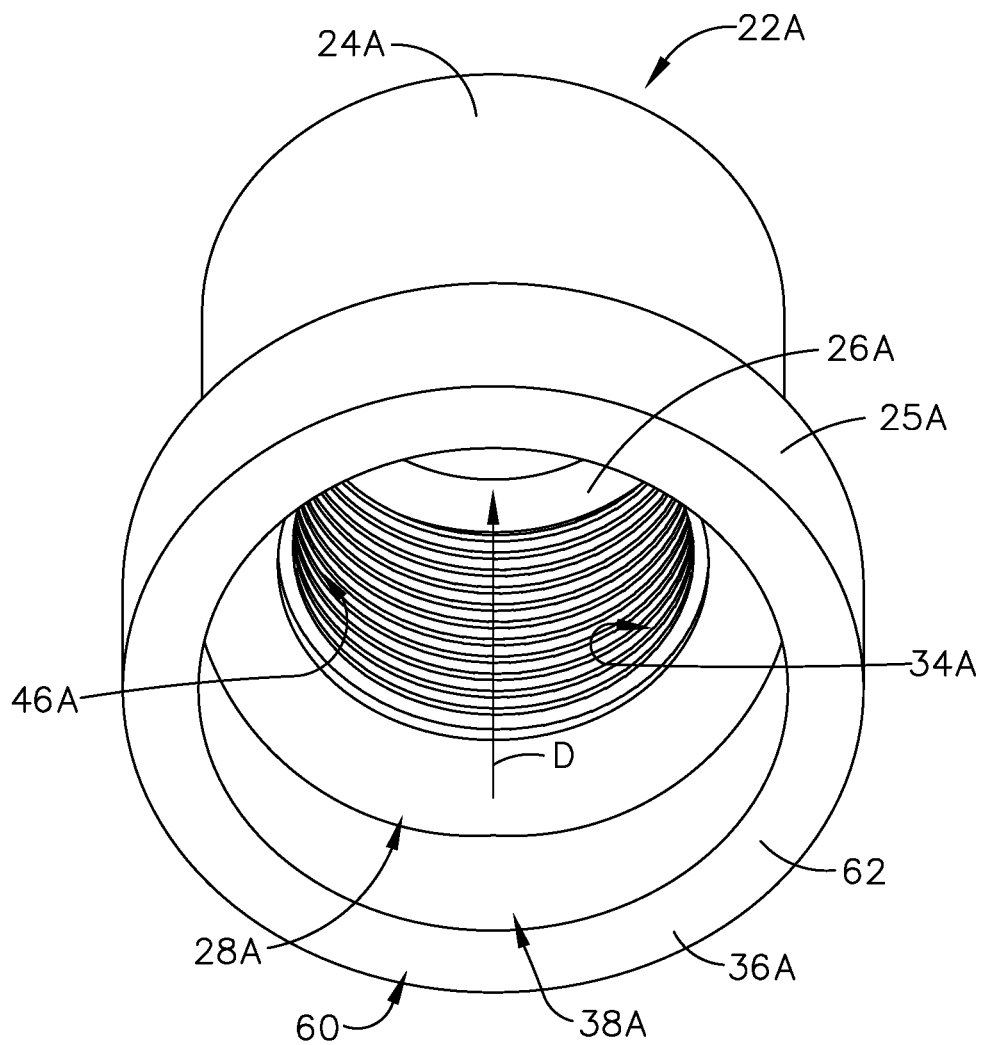
FIG. 4 is an enlarged bottom perspective view of the cap member of FIG. 1 showing a first example of the end of the cap member.

In FIGS. 1-3, first embodiment of cap system 22A is shown having cap member 24A. As mentioned earlier cap member 24A will be constructed of a nonconductive material such as one of a polymer, thermoset or other nonconductive materials. Cap member 24A has sidewall 25A having inner surface 26A, as seen in FIGS. 2-4, which defines cavity 28A which is dimensioned to receive bolt head 10. First securement mechanism 30A, as seen in FIG. 1, is positioned about periphery 32A of bolt head 10 of metallic bolt fastener 11. Inner surface 26A of cap member 24A defines second securement mechanism 34A, as seen in FIG. 4, which is complementary configured to engage first securement mechanism 30A positioned about periphery 32A of bolt head 10. End 36A of sidewall 25A of cap member 24A defines opening 38A which provides bolt head 10 to have access into cavity 28A.

As seen in FIG. 1, first securement mechanism 30A includes threads 40A which are interrupted or non-continuous as threads 40A extend about periphery 32A of bolt head 10. Threads 40A which are interrupted are defined by a plurality of ridge members 42A positioned on bolt head 10. Ridge members 42A extend in radial direction 44A away from bolt head 10. Adjacent ridge members 42A of the plurality of ridge members 42A are spaced apart about bolt head 10 wherein each ridge member 42A is equally spaced apart from adjacent ridge members 42A. This configuration of equally spaced apart ridge members 42A permit the installer to use a conventional socket wrench tool to engage bolt head 10 and tighten bolt head 10 with respect to nut (not shown) positioned on an opposing side of structure 14 so as to secure bolt head 10 to structure 14 without imparting damage to threads 40A positioned on ridge members 42A.

Second securement mechanism 34A includes threads 46A which are continuous in this example and are defined by inner surface 26A of sidewall 25A of cap member 24A, as seen in FIG. 4. Threads 46A extend about inner surface 26A of cap member 24A and extend in a direction D away from end 36A of sidewall 25A of cap member 24A, such that with bolt head 10 in a secured position with respect to structure 14 and threads 46A, defined by inner surface 26A of cap member 24A, engaging at least a portion of threads 40A, which are interrupted, end 36A of cap member 24A is positioned against structure 14 abutting surface 12 as shown in FIGS. 2 and 3. Threads 46A can accommodate and engage threads 40A of bolt head 10 as threads 40A may differ in elevation position relative to surface 12 as seen in FIG. 3. As seen in first example 50A of cap system 22A, threads 40A of bolt head 10 extend to a higher elevation from surface 12 with washer 20 being positioned between bolt head 10 and structure 14. With bolt head 10 in the secured position with respect to structure 14, threads 46A engage threads 40A engaging cap 24A to bolt head 10 and end 36A abuts surface 12 of structure 14. This is also the case with second example 50A1 of cap system 22A, as seen in FIG. 3, where bolt head 10 extends in a lesser elevation from surface 12 than in first example 50A with no washer being positioned between bolt head 10 and structure 14. With bolt head 10 in the secured position with respect to structure 14, threads 46A engage threads 40A engaging cap 24A to bolt head 10 and end 36A abuts surface 12 of structure 14. This construction with threads 46A extending along inner surface 26A of cap member 24A assures securement of cap member 24A to bolt head 10 and with end 36A abutting surface 12 enclosing bolt head 10 with bolt head 10 having differing positions with respect to surface 12.

Thus, with the installer having tightened metallic bolt fastener 11 such that bolt head 10 is in a secured position with respect to structure 14, the installer can then position first embodiment of cap member 24A to have threads 40A of bolt head 10 engage threads 46A of cap member 24A. The installer can then turn and tighten cap member 24A, with threads 40A and threads 46A engaged, until end 36A abuts surface 12. Cap member 24A is then secured to surface 12 and secured to bolt head 10 of metallic bolt fastener 11 enclosing bolt head 10. With threads 46A extending in direction D, threads 40A of bolt head 10 being positioned at different elevation profiles above surface 12, threads 40A can engage and reliably secure to threads 46A. With this configuration, cap member 24A is reliably secured to bolt head 10 of metallic bolt fastener 11 with end 36A abutting surface 12 resulting in cap member 24A securely enclosing bolt head 10 of metallic bolt fastener 11.

Figure 5:
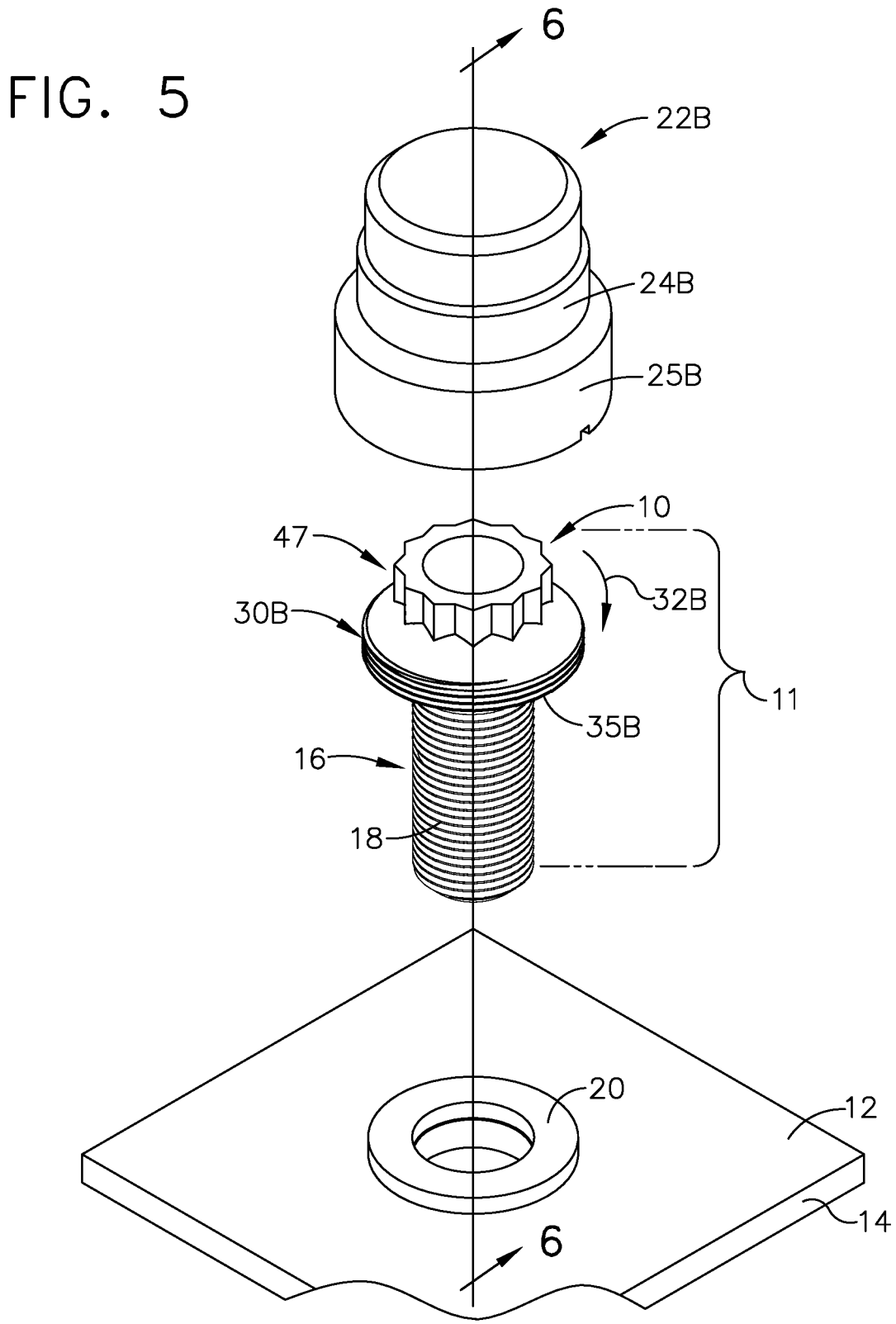
FIG. 5 is an exploded perspective view of a second embodiment of a cap system for enclosing a bolt head end of a metallic fastener extending from the structure.
Figure 6:
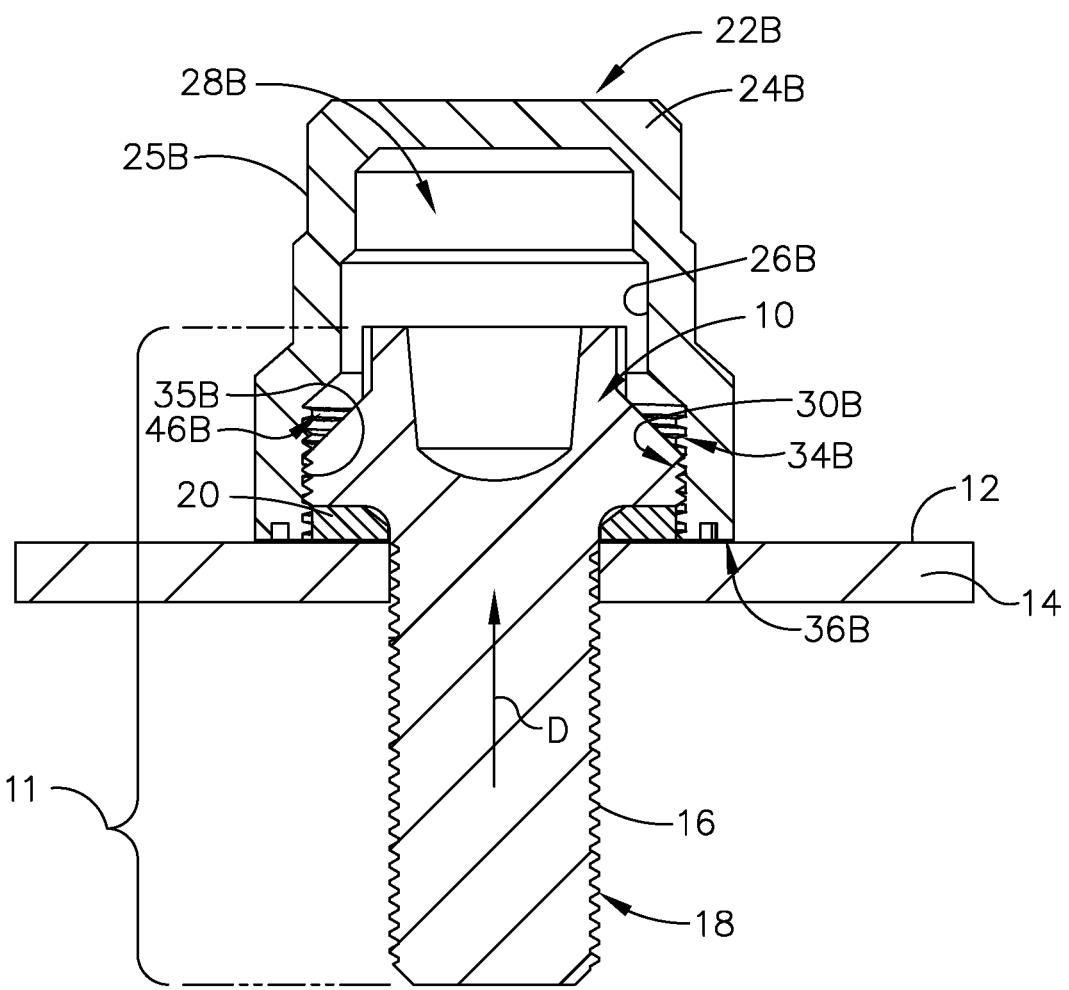
FIG. 6 is a cross section view along line 6-6 of FIG. 5 of the second embodiment of the cap system assembled enclosing the bolt head end of the metallic fastener.
Figure 7:
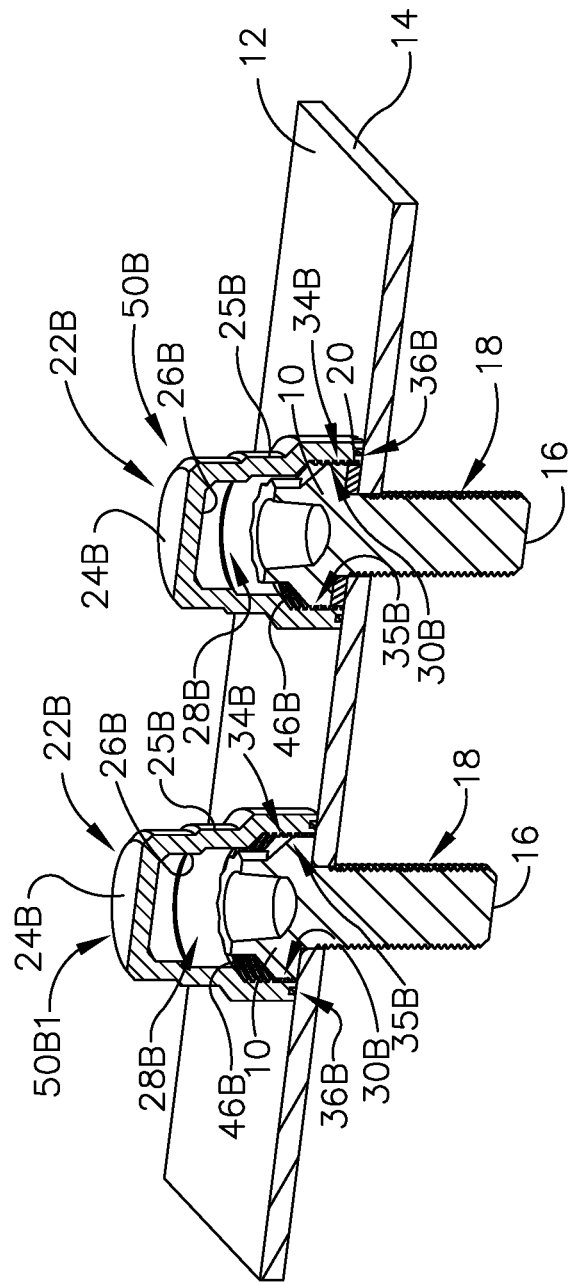
FIG. 7 is a perspective cross section view of employment of the second embodiment of the cap system of FIG. 5 assembled wherein a first example has a washer positioned between the bolt head and the structure and the second example has the bolt head positioned on a surface of the structure without a washer.
Figure 8:
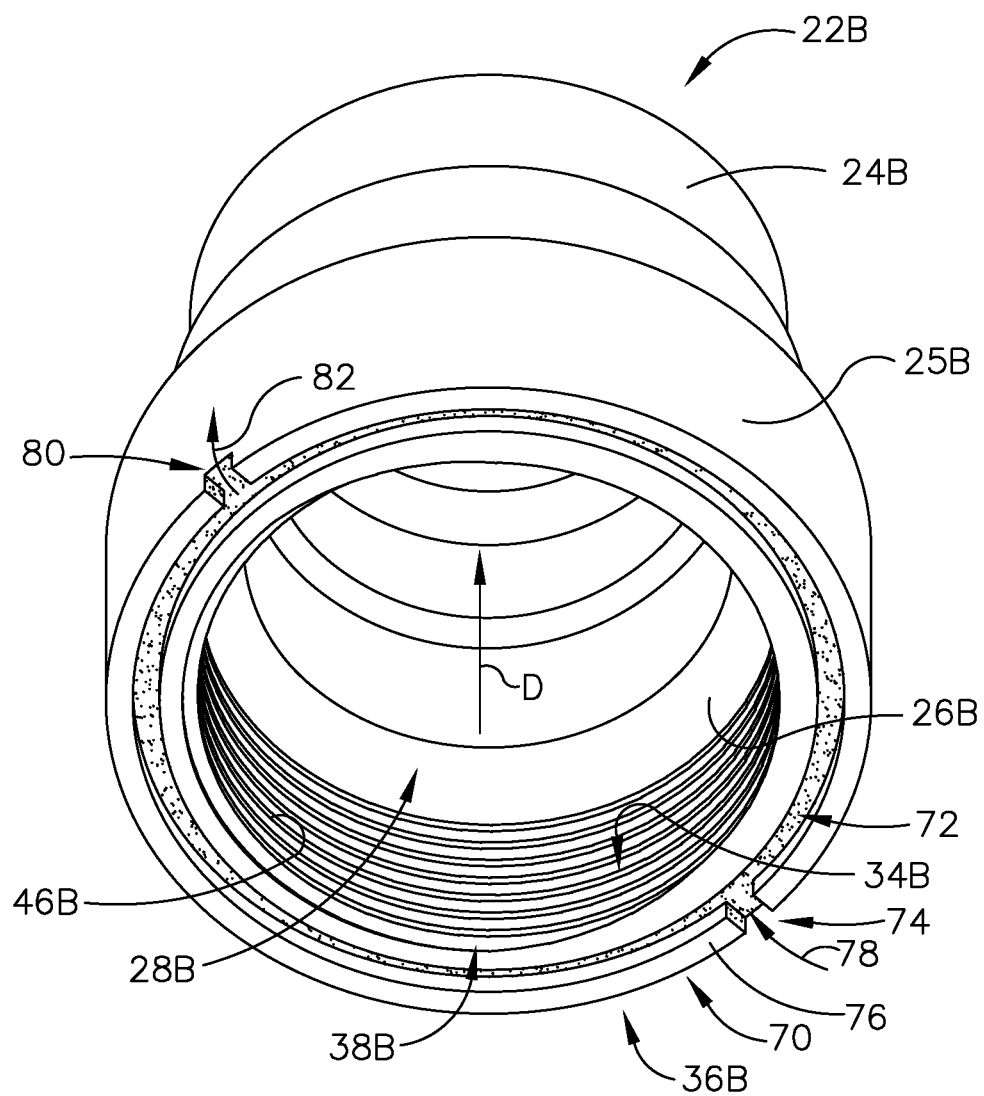
FIG. 8 is an enlarged bottom perspective view of the cap member of FIG. 5 showing a second example of the end of the cap member.

In referring to FIG. 5, second embodiment of cap system 22B is shown having cap member 24B. As mentioned earlier cap member 24B will be constructed of a nonconductive material such as one of a polymer, thermoset or other nonconductive material. Cap member 24B has sidewall 25B having an inner surface 26B, as seen in FIGS. 6-8, which defines cavity 28B which is dimensioned to receive bolt head 10. First securement mechanism 30B as seen in FIG. 5 includes continuous threads 35B positioned to extend uninterrupted about bolt head 10. Inner surface 26B, as seen in FIG. 8, defines second securement mechanism 34B which is complementary configured to engage first securement mechanism 30B positioned about periphery 32B of bolt head 10. End 36B of sidewall 25B of cap member 24B defines opening 38B which provides bolt head 10 to have access into cavity 28B.

As seen in FIG. 5, first securement mechanism 30B includes continuous threads 35B which extend uninterrupted about periphery 32B of bolt head 10. Continuous threads 35B are positioned in a lower portion of bolt head 10 so as not to interfere with spaced apart plurality of ridges configuration 47 positioned in an upper portion of bolt head 10. Plurality of ridges configuration 47 is compatible with a standard socket wrench, in this example, for securing bolt head 10, as described earlier, wherein a nut (not shown) with respect to FIG. 6 engages threads 18 of threaded shaft 16 and is tightened against structure 14 in conjunction with bolt head 10 being tightened against structure 14. As a result, nut and bolt head 10 exert a compression force onto structure 14 placing bolt head 10 in a secured position with respect to structure 14. Use of a standard socket wrench in this example will facilitate the securement of bolt head 10 in a secured position with respect to structure 14 without imparting damage to continuous threads 35B.

Second securement mechanism 34B includes continuous threads 46B defined by inner surface 26B of sidewall 25B of cap member 24B, as seen in FIG. 8, which are complementary configured to engage continuous threads 35B of first securement mechanism 30B. Continuous threads 46B extend about inner surface 26B of sidewall 25B of cap member 24B and extend in a direction D away from end 36B of sidewall 25B of cap member 24B. As will be discussed further below, with bolt head 10 in a secured position in relationship to structure 14 and with threads 46B engaging at least a portion of continuous threads 35B of bolt head 10, end 36B is positioned against structure 14 enclosing bolt head 10 of metallic bolt fastener 11. Threads 46B extend in direction D away from end 36B of cap member 24B, such that with bolt head 10 in a secured position with respect to structure 14 and with continuous threads 46B, defined by inner surface 26B of cap member 24B, engaging at least a portion of continuous threads 35B which extend about periphery 32B of bolt head 10, end 36B of cap member 24B is positioned against structure 14 abutting surface 12, as shown in FIGS. 6 and 7. Threads 46B can accommodate and engage continuous threads 35B of bolt head 10 with continuous threads 35B positioned at different elevation positions relative to surface 12 as seen in FIG. 7. As seen in first example 50B of cap system 22B, continuous threads 35B of bolt head 10 extend to a higher elevation from surface 12 with washer 20 positioned between bolt head 10 and structure 14. With bolt head 10 in the secured position with respect to structure 14, as earlier described, threads 46B engage continuous threads 35B engaging cap member 24B to bolt head 10 and end 36B abuts surface 12 of structure 14. This is also the case with second example 50B1 of cap system 22B, as seen in FIG. 7, where bolt head 10 which extends in a lesser elevation from surface 12 than in first example 50B with no washer being positioned between bolt head 10 and structure 14 threads 46B engage continuous threads 35B engaging cap member 24B to bolt head 10 and end 36B abuts surface 12 of structure 14. This construction with threads 46B extending along inner surface 26B of cap member 24B assures securement of cap member 24B to bolt head 10 with end 36B abutting surface 12 enclosing bolt head 10 with bolt head 10 having differing positions with respect to surface 12.

Thus, with the installer having tightened metallic bolt fastener 11 such that bolt head 10 is in a secured position with respect to structure 14, the installer can then position second embodiment of cap member 24B to have continuous threads 35B of bolt head 10 engage continuous threads 46B of cap member 24B. The installer can then turn and tighten cap member 24B, with continuous threads 35B and continuous threads 46B engaged, until end 36B abuts surface 12. Cap member 24B is then secured to surface 12 of structure 14 enclosing bolt head 10. With threads 46B extending in direction D, continuous threads 35B of bolt member 10 being positioned at different elevation profiles above surface 12 can engage and reliably secure to continuous threads 46B. With this configuration, cap member 24B is reliably secured to bolt head 10 of metallic bolt fastener 11 with end 36B abutting surface 12 resulting in cap member 24B securely enclosing bolt head 10 of metallic bolt fastener 11.

Figure 9:
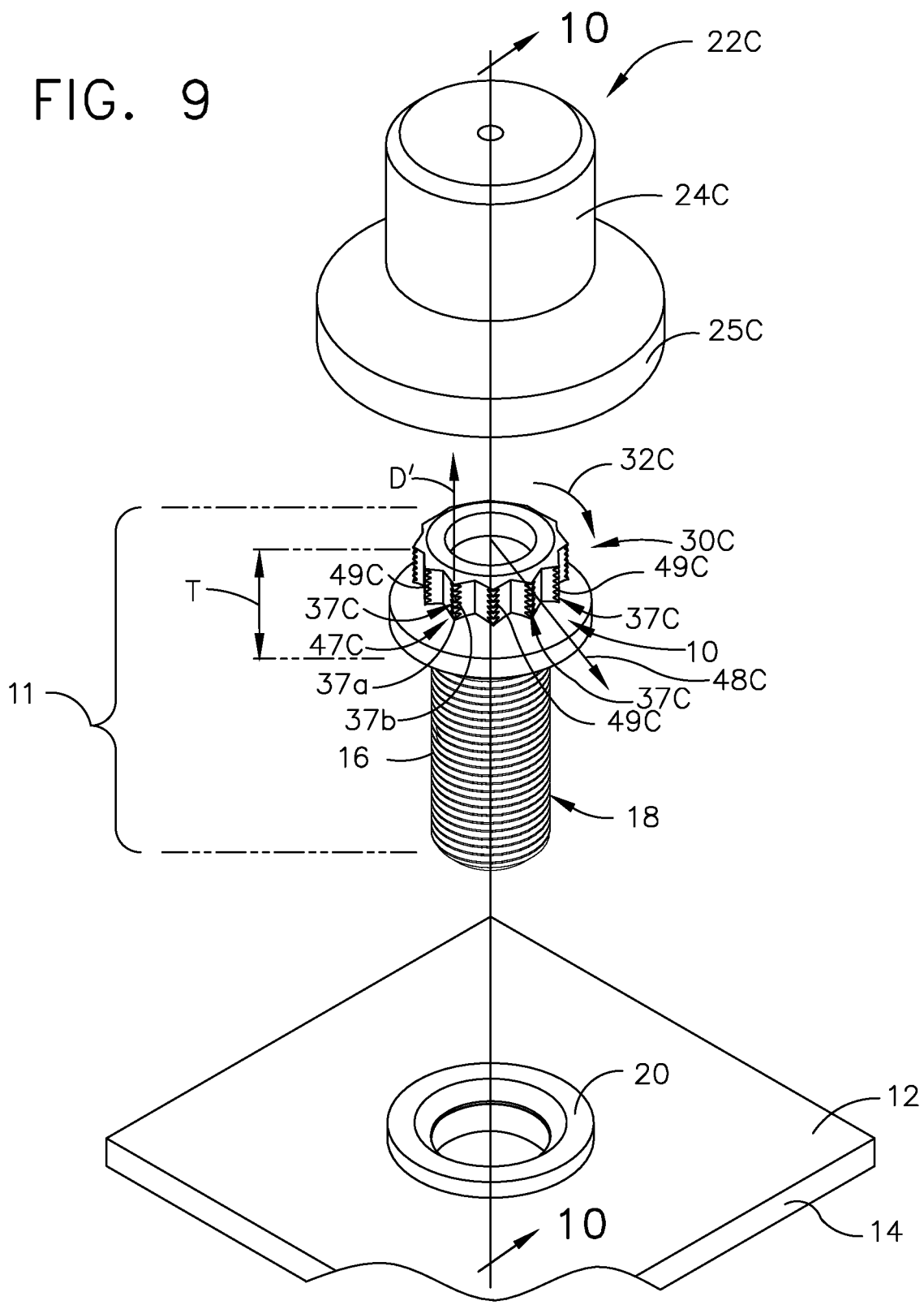
FIG. 9 is an exploded perspective view of a third embodiment of a cap system for enclosing a bolt head end of a metallic fastener extending from the structure.
Figure 10:
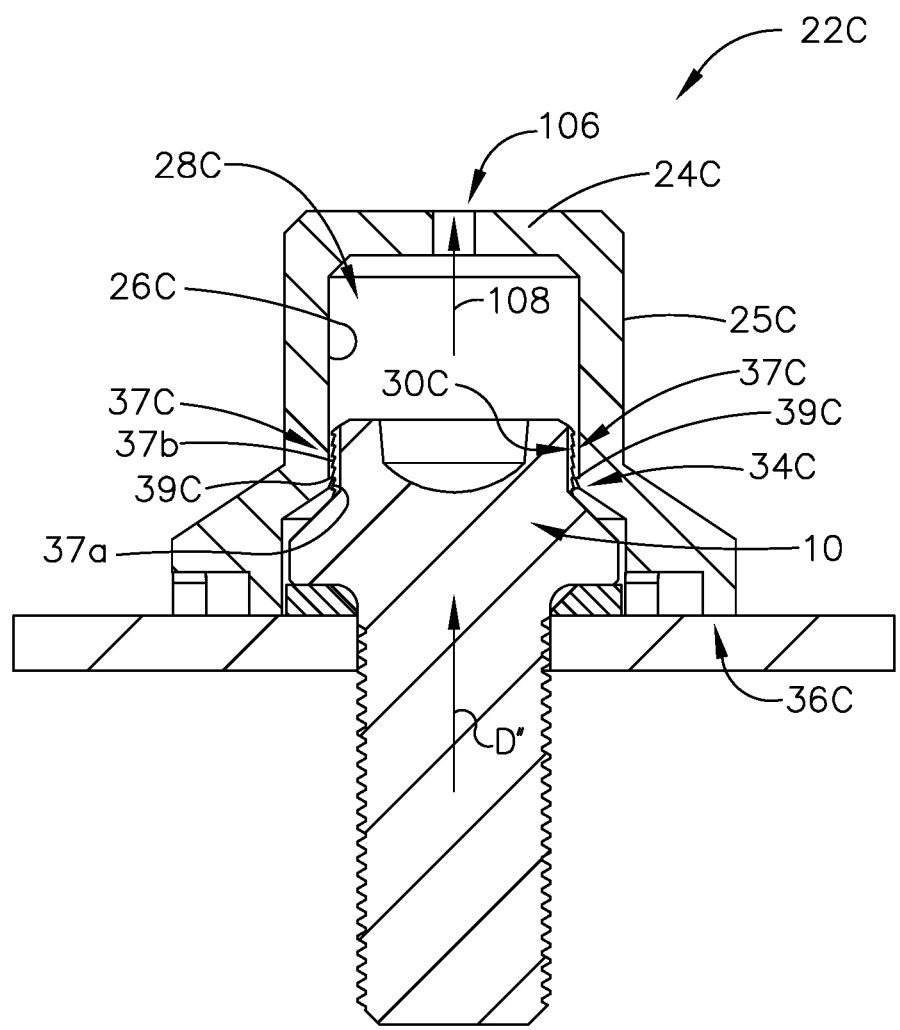
FIG. 10 is a cross section view along line 10-10 of FIG. 9 of the third embodiment of the cap system assembled enclosing the bolt head end of the metallic fastener.
Figure 11:
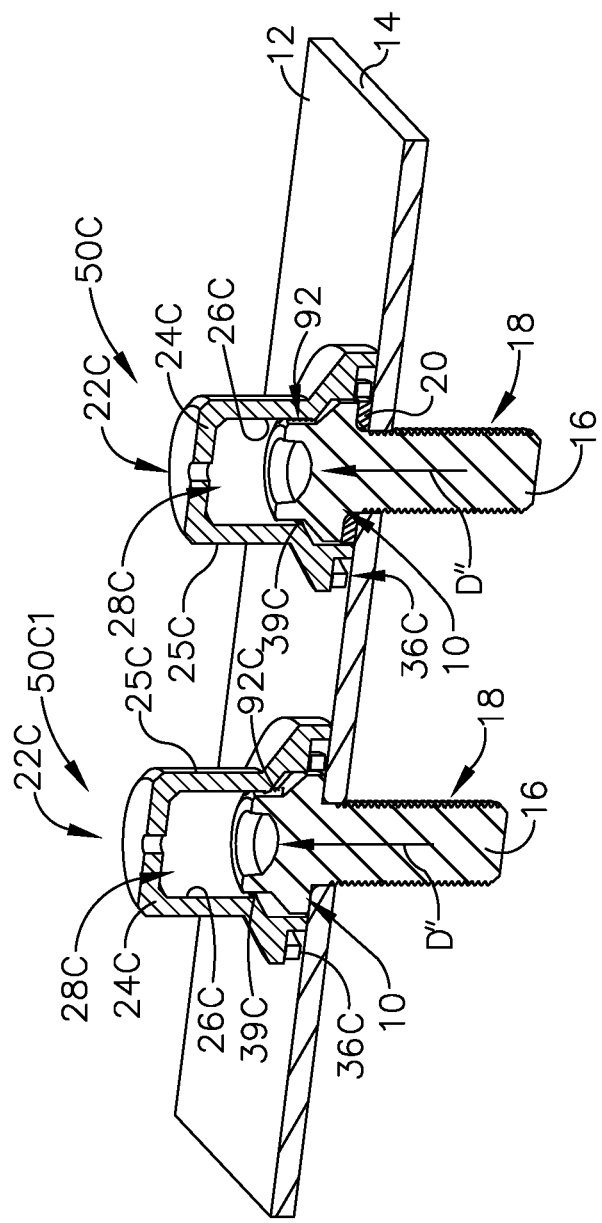
FIG. 11 is a perspective cross section view of employment of the third embodiment of the cap system of FIG. 9 assembled wherein a first example has a washer positioned between the bolt head and the structure and the second example has the bolt head positioned on a surface of the structure without a washer.
Figure 12:
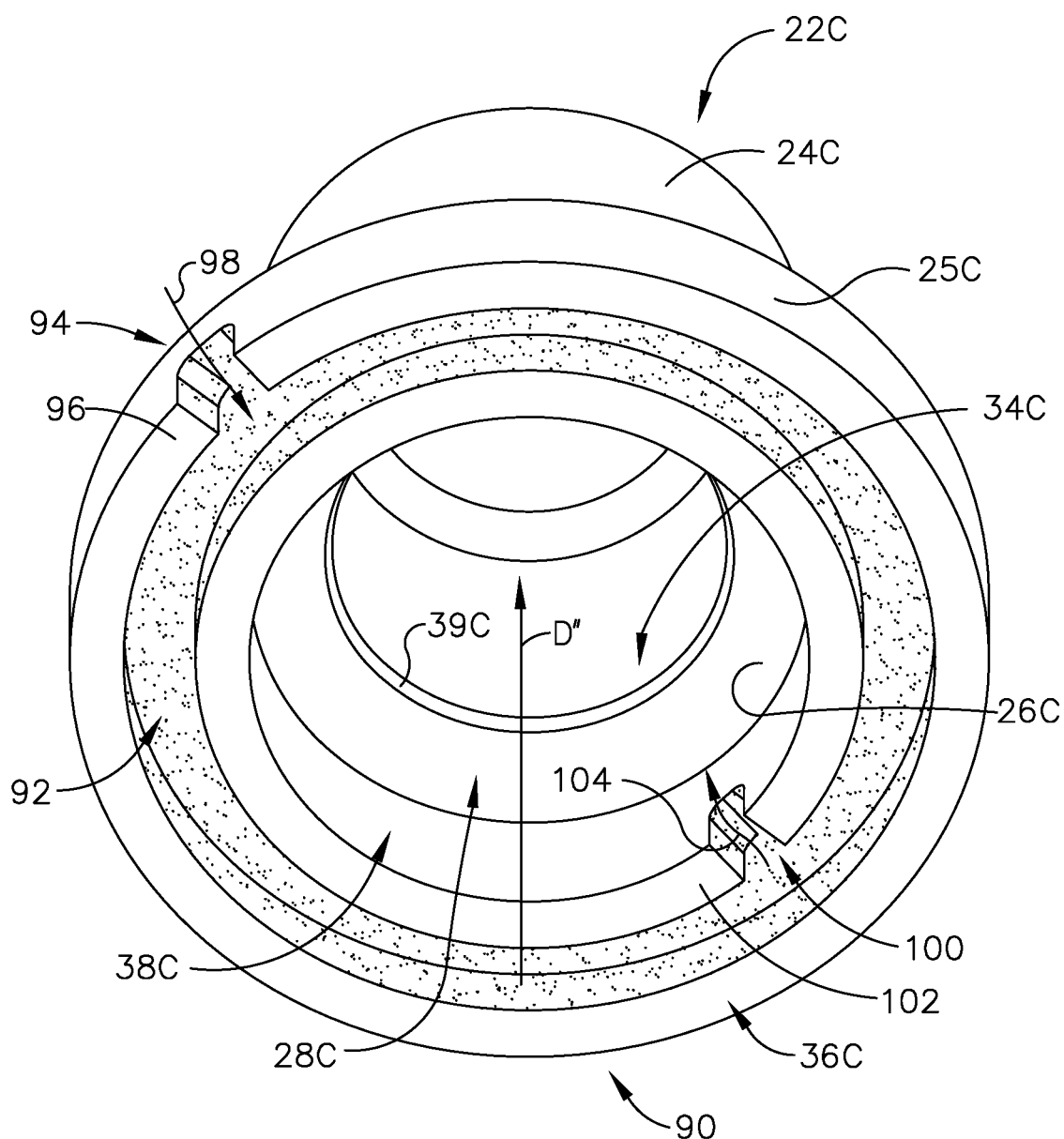
FIG. 12 is an enlarged bottom perspective view of the cap member of FIG. 9 showing a third example of the end of the cap member.

In referring to FIG. 9, third embodiment of cap system 22C is shown having cap member 24C. As mentioned earlier cap member 24C will be constructed of a nonconductive material such as one of a polymer, thermoset or other nonconductive material. Cap member 24C has sidewall 25C having an inner surface 26C, as seen in FIGS. 10-12, which defines cavity 28C which is dimensioned to receive bolt head 10. First securement 30C as seen in FIG. 9 is positioned about periphery 32C of bolt head 10. Inner surface 26C of cap member 24C defines second securement mechanism 34C, as seen in FIGS. 10 and 12, which is complementary configured to engage first securement mechanism 30C positioned about periphery 32C of bolt head 10. End 36C of sidewall 25C of cap member 24C defines opening 38C which provides bolt head 10 to have access into cavity 28C.

As seen in FIG. 9, first securement mechanism 30C includes a plurality of grooves 37C positioned spaced apart about periphery 32C of bolt head 10. Plurality of ridge members 49C, which extend in a radial direction 48C away from bolt head 10, define plurality of grooves 37C. Adjacent ridge members 49C are spaced apart about bolt head 10. Each of the plurality of ridge members 49C is equally spaced apart from adjacent ridge members 49C. A portion of plurality of grooves 37C are positioned spaced apart on each ridge member 49C aligned in row 47C, as seen in FIG. 9. Rows 47C of a portion of the plurality of grooves 37C are positioned in this example on each of ridge members 49C positioned about bolt head 10. Rows 47C extend in direction D' which extends in the direction of thickness T of bolt head 10. This configuration of spaced apart ridge members 49C permits the installer to use a conventional socket wrench tool to engage bolt head 10 and tighten bolt head 10 with respect to a nut (not shown) positioned on threaded shaft 16 and positioned on opposing side of structure 14 than bolt head 10 placing bolt head 10 in a secured position relative to structure 14 without imparting damage to portions of plurality of grooves 37C positioned on ridge members 49C.

Second securement mechanism 34C, as seen in FIGS. 10 and 12, which includes at least one annular ledge 39C defined by inner surface 26C of sidewall 25C of cap member 24C. At least one annular ledge 39C is positioned about inner surface 26C of cap member 24C and is positioned spaced away in a direction D" from end 36C of cap member 24C. The at least one annular ledge 39C is spaced away from end 36C such that with bolt head 10 in a secured position with respect to structure 14, as earlier described, and with at least one annular ledge 39C engaging at least one of the plurality of grooves 37C, end 36C of cap member 24C is positioned against structure 14 enclosing and securing to bolt head 10 of metallic bolt fastener 11. Bolt head 10 is constructed, in this example, with metallic material and is less flexible than at least one annular ledge 39C constructed of a more flexible material such as a polymer or thermoset material wherein as the installer pushes down on cap member 24C over bolt head 10 of metallic bolt fastener 11 at least one annular ledge 39C will flex against bolt head 10. In this example, at least one annular ledge 39C will flex back into at least one of plurality of grooves 37C as grooves 37C come into alignment with at least one annular ledge 39C. Once end 36C of cap member 24C abuts against surface 12 of structure 14 and at least one annular ledge 39C is in alignment with a groove within plurality of grooves 37C, cap member 24C is secured to bolt head 10 of metallic bolt fastener 11 and against surface 12 enclosing bolt head 10.

In FIG. 11, first example 50C of cap system 22C is shown wherein bolt head 10 of metallic bolt fastener 11 extends above surface 12 of structure 14 in a secured position relative to structure 14 and cap member 24C encloses bolt head 10 and secures to bolt head 10 of metallic bolt fastener 11. In referring to first example 50C, bolt head 10 is in a secured position relative to structure 14 with washer 20 positioned between bolt head 10 and surface 12 of structure 14. Grooves within plurality of grooves 37C, as seen in FIG. 9, are positioned in each row 47C at predetermined elevations above surface 12 of structure 14. For example, as seen in FIG. 9 grooves 37a and 37b will be positioned at predetermined elevations above surface 12 with bolt head 10 in a secured position relative to structure 14. At least one annular ledge 39C of cap member 24C, as seen in FIG. 12, can be positioned spaced away in direction D" from end 36C, such that with end 36C abutting surface 12 of structure 14, at least one annular ledge 39C engages a groove within plurality of grooves 37C at an elevation above surface 12 which are positioned for example as groove 37a as seen in FIG. 10.

In referring to second example 50C1, bolt head 10 is in a secured position relative to structure 14 with bolt head 10 positioned directly on surface 12 without a washer positioning plurality of grooves 37C at a lower elevation profile above surface 12 than positioned in first example 50C. At least one annular ledge 39C of cap member 24C, as used in first example 52C, engages a groove within plurality of grooves 37C at an elevation above surface 12 aligned with groove 37b, as seen in FIGS. 9 and 10, where groove 37b is positioned above groove 37a on bolt head 10, with end 36C abutting surface 12 of structure 14. With bolt head 10, in second example 50C1, in a lower profile within cap member 24C than in first example 50C, without having a washer positioned between bolt head 10 and surface 12, groove 37b is positioned above groove 37a so as to be able to attain engaging alignment with annular ledge 39C and have end 46C abut surface 12 of structure 14.

In these examples, such as first example 50C and second example 50C1 of cap system 22C, at least one annular ledge 39C can be positioned within cap member 24C spaced away from end 36C such that with bolt head 10 in a secured position on surface 12 of structure 14 with washer 20 or without a washer, at least one annular ledge 39C is positioned within cap member 24C so as to engage grooves 37C such as 37a or 37b, as described above, with end 36C abutting surface 12 of structure 14.

Thus, in this third embodiment of cap system 26C, the installer having tightened metallic bolt fastener 11 relative to nut (not shown) positioned on an opposing side of structure 14 than the side upon which bolt head 10 resides such that bolt head 10 is in a secured position relative to structure 14, the installer can then position third embodiment of cap member 24C over bolt head 10 and push cap member 24C over bolt head 10flexing at least one annular ledge 39C of inner surface 26C of cap member 24C until cap member 24C abuts surface 12 of structure 14 a groove of plurality of grooves 37C of bolt head 10 engage at least one annular ledge 39C. Cap member 24C is then secured to bolt head 10 and abuts surface 12 of structure 14 enclosing bolt head 10 of metallic bolt fastener 11. As explained above, with at least one annular ledge 39C spaced away extending in direction D" from end 36C of cap member 24C, plurality of grooves 37C of bolt head 10 positioned at different predetermined elevation profiles above surface 12, such as in this example 37a and 37b, can engage and reliably secure at least one annular ledge 39C securing cap member 24C to bolt head 10 of metallic bolt fastener 11 with end 36C abutting surface 12 resulting in cap member 24C securing to and enclosing bolt head 10 of metallic bolt fastener 11.

Figure 13:
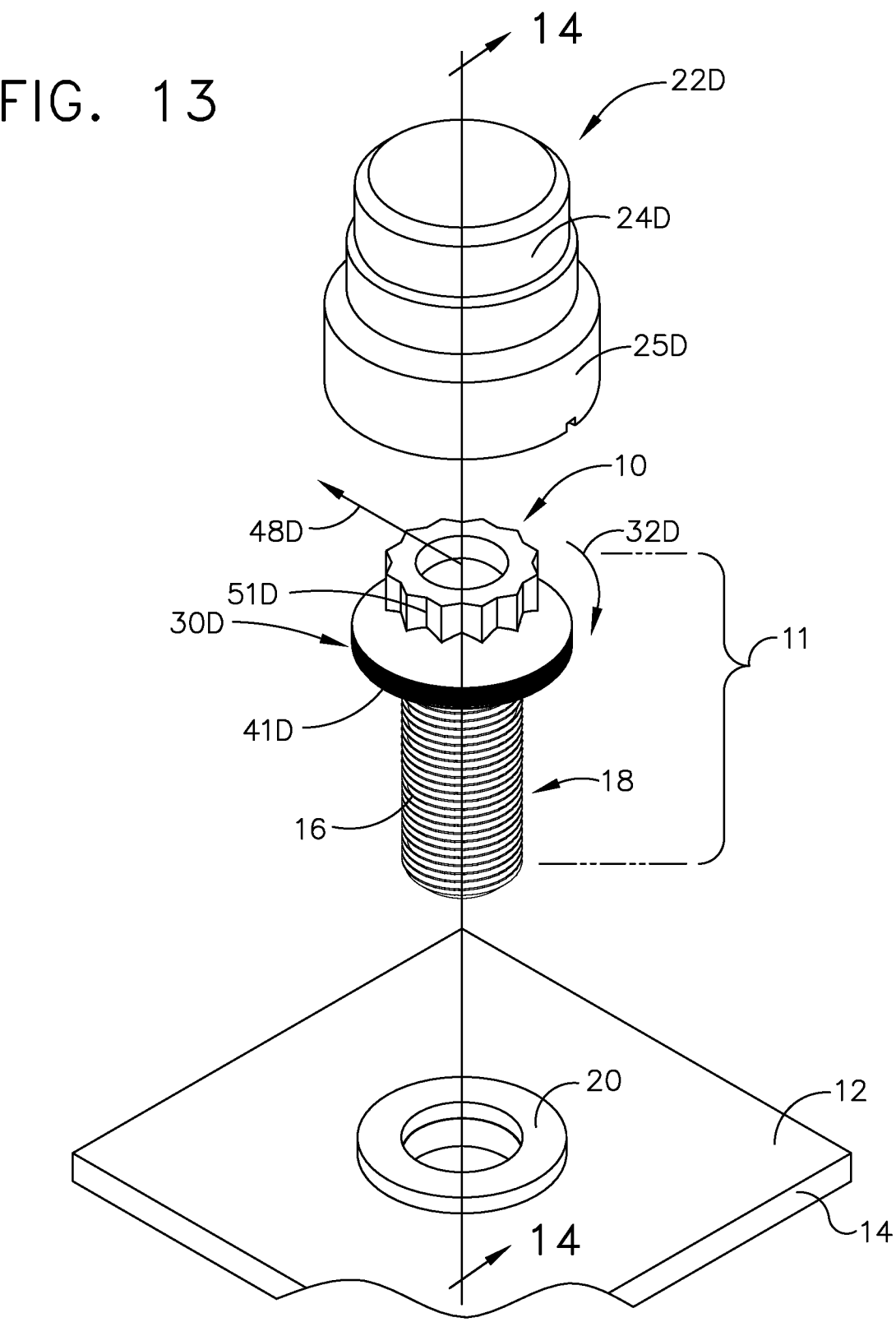
FIG. 13 is an exploded perspective view of a fourth embodiment of a cap system for enclosing a bolt head end of a metallic fastener extending from the structure.
Figure 14:
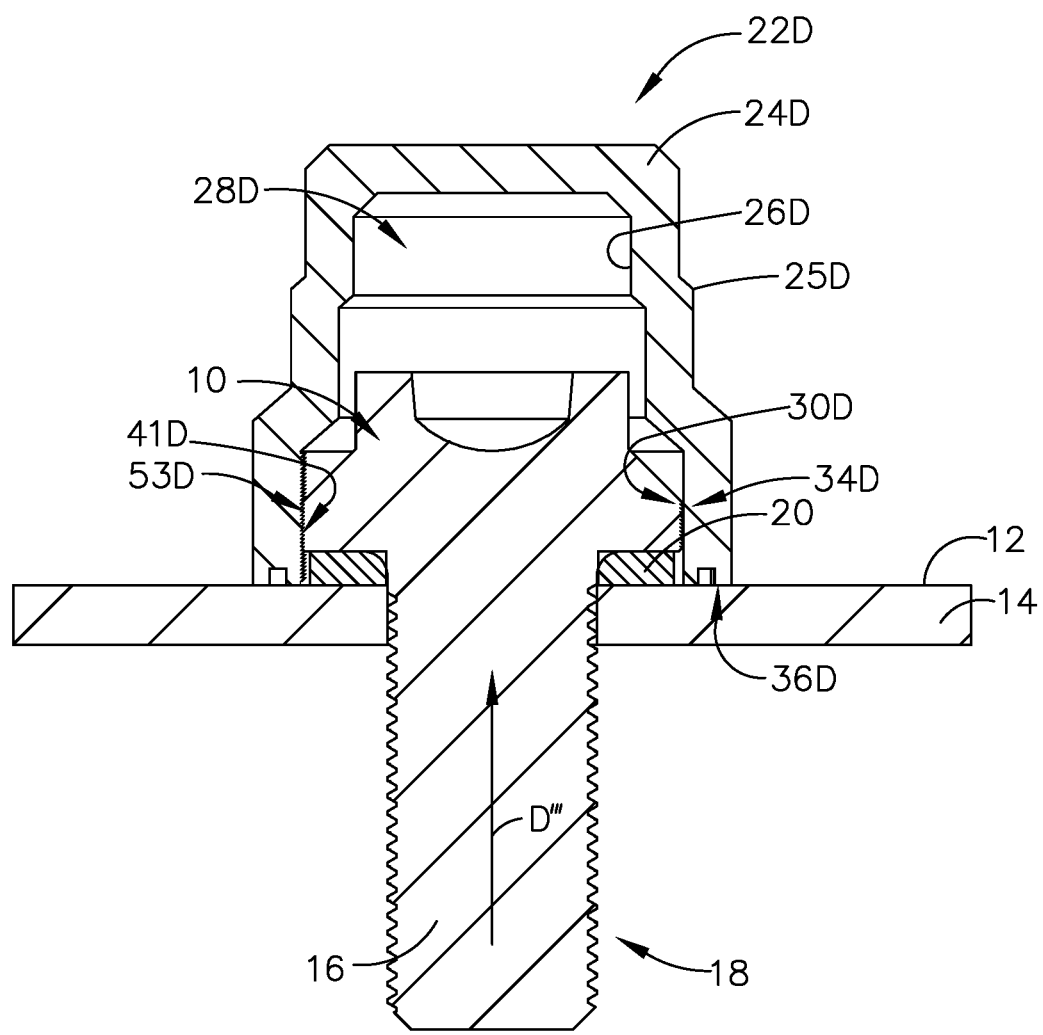
FIG. 14 is a cross section view along line 14-14 of FIG. 13 of the fourth embodiment of the cap system assembled enclosing the bolt head end of the metallic fastener.
Figure 15:
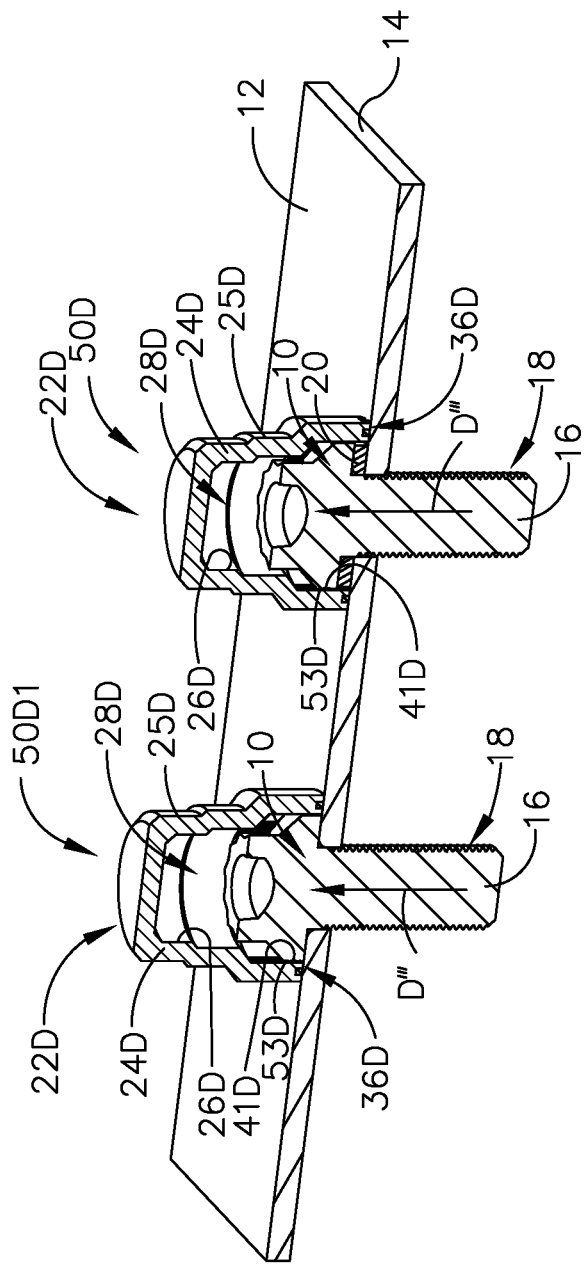
FIG. 15 is a perspective cross section view of employment of the fourth embodiment of the cap system of FIG. 13 assembled wherein a first example has a washer positioned between the bolt head and the structure and the second example has the bolt head positioned on a surface of the structure without a washer.
Figure 16:
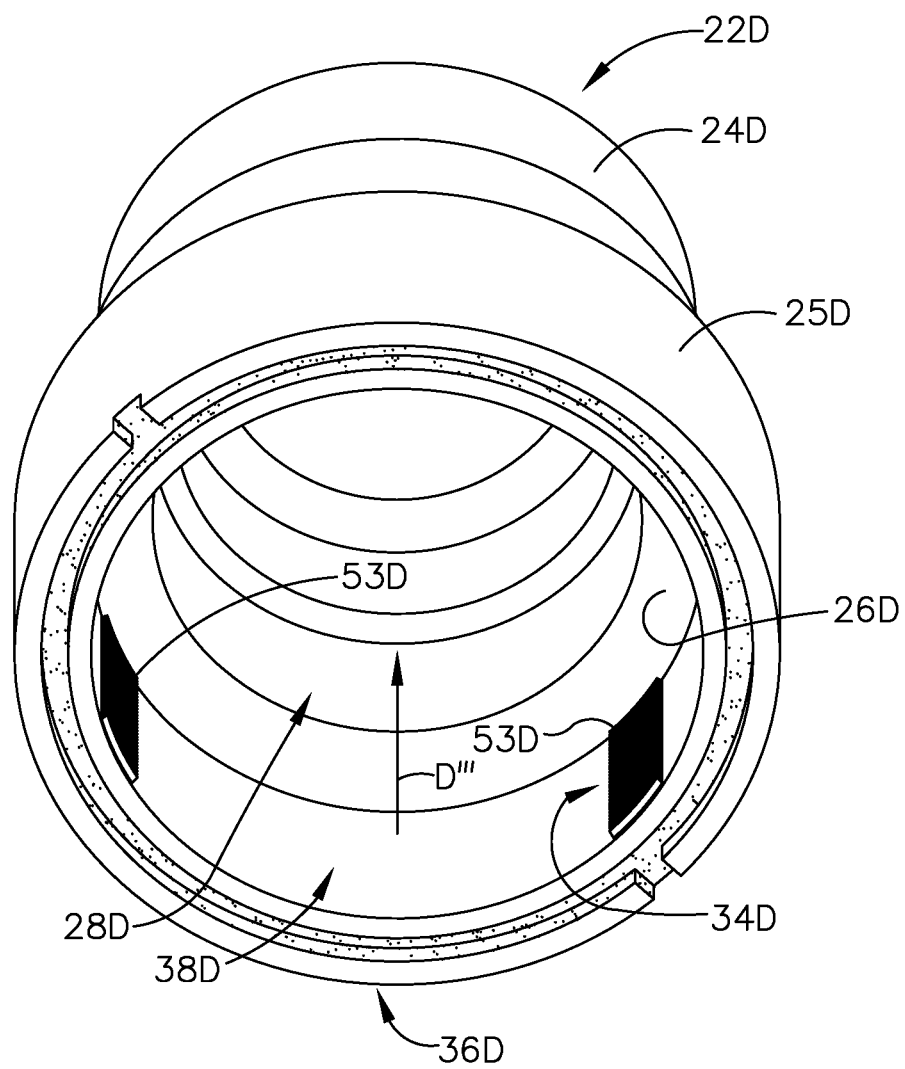
FIG. 16 is an enlarged bottom perspective view of the cap member of FIG. 13 showing the second example of the end of the cap member.

In referring to FIG. 13, fourth embodiment of cap system 22D is shown having cap member 24D. As mentioned earlier cap member 24D will be constructed of a nonconductive material such as one of a polymer, thermoset or other nonconductive material. Cap member 24D has sidewall 25D having an inner surface 26D, as seen in FIGS. 14-16 which defines cavity 28D which is dimensioned to receive bolt head 10. First securement 30D as seen in FIG. 13 is positioned about periphery 32D of bolt head 10. Inner surface 26D of cap member 24D defines second securement mechanism 34D, as seen in FIG. 16, which is complementary to engage first securement mechanism 30D positioned about periphery 32D of bolt head 10. End 36D of sidewall 25D of cap member 24D defines opening 38D which provides bolt head 10 access into cavity 28D.

As seen in FIG. 13, first securement mechanism 30D includes a plurality of continuous grooves 41D which extend about periphery 32D of bolt head 10. Continuous grooves 41D are positioned in a lower portion of bolt head 10 so as not to interfere with plurality of ridges configuration 51D positioned in an upper portion of bolt head 10. Plurality of ridges configuration 51D is compatible with a standard socket wrench, in this example, for securing bolt head 10 in a secured position, as described earlier, with respect to structure 14 without imparting damage to continuous grooves 41D.

Second securement mechanism 34D, as seen in FIG. 16, includes plurality of teeth 53D positioned along inner surface 26D of sidewall 25D of cap member 24D. Plurality of teeth 53D are positioned about at least a portion of inner surface 26D of cap member 24D. Plurality of teeth 53D are positioned extending in a direction D''' along inner surface 26D of cap member 24D away from end 36D of cap member 24D such that with bolt head 10 of metallic bolt fastener 11 in a secured position with respect to structure 14 and with at least a portion of plurality of teeth 53D engaging at least a portion of the plurality of continuous grooves 41D, end 36D of cap member 24D is positioned against structure 14. Bolt head 10 is constructed, in this example, with metallic material and is less flexible than plurality of teeth 53D constructed of a more flexible material such as a polymer or thermoset material wherein as the installer pushes down on cap member 24D over bolt head 10 of metallic bolt fastener 11 plurality of teeth 53D will flex against bolt head 10. In this example, plurality of teeth 53D will flex back into plurality of continuous grooves 41D as continuous grooves 41D come into alignment with plurality of teeth 53D. Once end 36D of cap member 24D abuts against surface 12 of structure 14 and at least a portion of plurality of teeth 53D are in alignment with at least a portion of plurality of continuous grooves 41D, cap member 24D is secured to bolt head 10 of metallic bolt fastener 11 and cap member 24D is positioned against surface 12 of structure 14.

In FIG. 15, first example 50D of fourth embodiment of cap system 22D is shown wherein bolt head 10 of metallic bolt fastener 11 extends above surface 12 of structure 14 in a secured position relative to structure 14 and cap member 24D encloses bolt head 10 and secures to bolt head 10 of metallic bolt fastener 11. In referring to first example 50D, bolt head 10 is in a secured position relative to structure 14 with washer 20 positioned between bolt head 10 and surface 12 of structure 14, placing continuous grooves 41D of bolt head 10 engaged by plurality of teeth 53D positioned above surface 12 at an elevation profile greater than that of second example 50D1 of FIG. 15 as discussed below.

In second example 50D1 fourth embodiment of cap system 22D bolt head 10 is in a secured position relative to structure 14 with bolt head 10 positioned directly on surface 12 without a washer, positioning plurality of continuous grooves 41D above surface 12 at a lower elevation profile than that of plurality of continuous grooves 41D of first example 50D. Plurality of teeth 53D within cap member 24D extend in direction D''' as seen in FIGS. 15 and 16 permit at least a portion of plurality of continuous grooves 41D of bolt head 10 to be engaged to at least a portion of plurality of teeth 53D in both the first example 50D and second example 50D1 with end 36D of sidewall 25D of cap member 24D abutting surface 12 of structure 14 thereby providing a secured enclosure of bolt head 10 of metallic bolt fastener 11 regardless of the difference in elevation profile of plurality of continuous grooves 41D with respect to surface 12 of structure 14.

Thus, in this fourth embodiment of cap system 26D, the installer having tightened bolt head 10 of metallic bolt fastener 11 relative to structure 14, as described earlier, relative to nut (not shown) positioned on an opposing side of structure 14 than the side upon which bolt head 10 resides, such that bolt head 10 is in a secured position relative to structure 14, the installer can then position fourth embodiment of cap member 24D over bolt head 10. The installer can then push cap member 24D over bolt head 10 flexing plurality of teeth 53D positioned on inner surface 26D of cap member 24C until cap member 24C abuts surface 12 of structure 14 and at least a portion of plurality of continuous grooves 41D of bolt head 10 engage at least a portion of plurality of teeth 53D. Cap member 24D is then secured to bolt head 10 and abuts surface 12 of structure 14 enclosing end portion 10 of metallic fastener assembly 11. As explained above, with plurality of teeth 53D extending in direction D''', plurality of continuous grooves 41D of bolt head 10 positioned at different elevation profiles above surface 12 of structure 14 can engage and reliably secure to plurality of teeth 53D securing cap member 24D to bolt head 10 of metallic bolt fastener 11 with end 36D abutting surface 12 thereby securing cap member 24D to bolt head 10 and enclosing bolt head 10 of metallic bolt fastener 11.

In installing cap members of the cap system described above, selective configurations for ends 36A-D of cap members 24A-D respectively can be employed. Three examples of configurations include examples 60, 70 and 90 to be discussed in greater detail below. For example, with respect to ends 36A and 36C, any of the three examples 60, 70 or 90 can be employed and for example, with respect to ends 36B and 36D, first or second examples 60 or 70 can be employed.

First example 60, shown in FIG. 4, end 36A, of cap member 24A forms a continuous annular flat surface 62 which will abut surface 12 of a planar configuration of structure 14 as seen in FIGS. 2-4.

Second example 70, of configuration of an end, is shown in FIGS. 8 and 16 as end 36B and 36D respectively. Since the second example 70 is the same configuration for FIG. 8 as is in FIG. 16, second example 70 will be described for end 36B, of FIG. 8, wherein sidewall 25B of cap member 24B defines groove 72 which extends about cap member 24B. First opening 74 defined by and extends through first portion 76 of sidewall 25B of cap member 24B communicates with groove 72 such that a first flow path 78 extends through first opening 74 and into groove 72 for conveyance of sealant through first opening 74 into groove 72. Second opening 80, defined by and extends through first portion 76 of sidewall 25B of cap member 24B, is spaced apart about cap member 24B from first opening 74 wherein second opening 80 communicates with groove 72 such that second flow path 82 extends from groove 72 through second opening 80 of cap member 24B for conveyance of sealant.

With respect to second example 70, once installer has secured cap member 24B to surface 12 of structure 14, the installer will inject a sealant material into first opening 74 having sealant flow in groove 72 about cap member 24B until sealant begins to leak from second opening 80. At that point the installer has a confirmation that sealant has been positioned within groove 72 providing additional assurance to the installer that bolt head 10 of metallic bolt fastener 11 has been further electrically isolated within cap member 24B. Second example 70 configuration provides the installer ability to not expel excessive sealant onto surface 12 and reduces the need for tedious and time consuming smoothing out of excess sealant.

Third example 90 of configuration of an end is shown in FIG. 12 as end 36C. Sidewall 25C of cap member 24C defines groove 92 which extends about cap member 24C. Third opening 94 defined by and extends through first portion 96 of sidewall 25C of cap member 24C such that third opening 94 communicates with groove 92. First flow path 98 extends through first portion 96 of sidewall 25C of cap member 24C and into groove 92 for conveyance of sealant. Fourth opening 100 defined by and extends through second portion 102 of sidewall 25C of cap member 24C such that fourth opening 100 communicates with groove 92 and fourth opening 100 communicates with cavity 28C of cap member 24C such that second flow path 104 extends from groove 92 through fourth opening 100 of sidewall 25C of cap member 24C and into cavity 28C. Once installer has injected sealant into groove 92 and sealant flows through groove 92 and expels into cavity 28C from fourth opening 100, the sealant continues to flow past bolt head 10 between ridge members 49C, in this example, upwardly into cap member 24C. Fifth opening 106, as seen in FIG. 10, defined by and extends through the sidewall 25C of cap member 24C such that fifth opening 106 provides a third flow path 108, as seen in FIG. 10.

With respect to third example 90, once the installer has secured cap member 2CB to surface 12 of structure 14, the installer will inject a sealant material into third opening 94 having sealant flow in groove 92 about cap member 24C. With groove 92 is nearly full or full of sealant, sealant begins to leak from fourth opening 100. At that point, the installer is still injecting sealant into third opening 94 and cavity 28C becomes full of sealant at which point sealant begins to expel from fifth opening 106. At that point installer understands cap member 24C is full of sealant and stops injecting further sealant. With sealant expelling from fifth opening 106, installer has a confirmation that sealant has been positioned within groove 92 and cavity 28C providing additional assurance to the installer that end portion 10 of metallic fastener assembly 11 has been further electrically isolated within cap member 24C. This third example configuration provides the installer the ability to not expel excessive sealant onto surface 12 and reduces the need for tedious and time consuming smoothing out of excess sealant.

While various embodiments have been described above, this disclosure is not intended to be limited thereto. Variations can be made to the disclosed embodiments that are still within the scope of the appended claims.

What is claimed:

1. A cap system for enclosing a metallic bolt fastener extending through a structure, comprising:
    a first securement mechanism positioned about a periphery of a bolt head of the metallic bolt fastener, which comprises threads which are interrupted and are defined by a plurality of ridge members positioned on the bolt head; and
    a cap member comprising a sidewall, having:
        an inner surface which defines a cavity dimensioned to receive the bolt head and defines a second securement mechanism complementary configured to engage the first securement mechanism positioned about the periphery of the bolt head; and
        an end of the sidewall of the cap member which defines an opening which provides the bolt head access into the cavity.

2. The cap system of claim 1, wherein:
    the plurality of ridge members extend in a radial direction away from the bolt head; and
    adjacent ridge members of the plurality of ridge members are spaced apart about the bolt head.

3. The cap system of claim 2, wherein each ridge member is equally spaced apart from adjacent ridge members.

4. The cap system of claim 3, wherein:
    the second securement mechanism comprises continuous threads defined by the inner surface of the cap member.

5. The cap system of claim 4, wherein:
    the threads defined by the inner surface of the cap member extend about the inner surface of the cap member; and
    the threads defined by the inner surface of the cap member extend in a direction away from the end of the cap member such that with the bolt head in a secured position with respect to the structure and the threads defined by the inner surface of the cap member engaging at least a portion of the threads which are interrupted, the end of the sidewall of the cap member is positioned against the structure.

6. The cap system of claim 5, wherein with the bolt head in the secured position with respect to the structure, a washer is positioned between the bolt head and the structure.

7. The cap system of claim 1, wherein the end of the sidewall of the cap member defines one of:
    a continuous annular flat surface; or
    a groove which extends about the cap member, wherein:
        a first opening defined by and extends through a first portion of the sidewall of the cap member wherein the first opening communicates with the groove such that a first flow path extends through the first opening and into the groove for conveyance of a sealant; and
        a second opening defined by and extends through the first portion of the sidewall of the cap member and spaced apart about the cap member from the first opening wherein the second opening communicates with the groove such that a second flow path extends from the groove through the second opening of the cap member for conveyance of sealant.

8. The cap system of claim 1, wherein the end of the sidewall of the cap member defines a groove which extends about the cap member, wherein:
    a third opening defined by and extends through a first portion of the sidewall of the cap member wherein the third opening communicates with the groove such that a first flow path extends through the first portion of the sidewall of the cap member and into the groove for conveyance of sealant;
    a fourth opening defined by and extends through as second portion of the sidewall of the cap member wherein the fourth opening communicates with the groove and the fourth opening communicates with the cavity of the cap member such that a second flow path extends from the groove, through the fourth opening and into the cavity; and
    a fifth opening defined by and extends through the sidewall of the cap member wherein the fifth opening provides a third flow path from the cavity of the cap member through the fifth opening.

9. A cap system for enclosing a metallic bolt fastener extending through a structure, comprising:
a first securement mechanism positioned about a periphery of a bolt head of the metallic bolt fastener which comprises continuous threads which extend about the periphery of the bolt head; and
a cap member comprising a sidewall, having:
an inner surface which defines a cavity dimensioned to receive the bolt head and defines a second securement mechanism which comprises continuous threads complementary configured to engage the continuous threads of the first securement mechanism; and
an end of the sidewall of the cap member defines an opening which provides the bolt head access into the cavity and defines a groove which extends about the cap member;
a first opening defined by and extends through a first portion of the sidewall of the cap member wherein the first opening communicates with the groove such that a first flow path extends through the first opening and into the groove for conveyance of a sealant; and
a second opening defined by and extends through the first portion of the sidewall of the cap member with the second opening spaced apart about the cap member from the first opening and the second opening communicates with the groove such that a second flow path extends from the groove through the second opening of the cap member for conveyance of sealant.

10. The cap system of claim 9, wherein:
the continuous threads defined by the inner surface of the cap member extend about the inner surface of the cap member; and
the continuous threads defined by the inner surface of the cap member extend in a direction away from the end of the cap member such that with the bolt head in a secured position with respect to the structure and the continuous threads defined by the inner surface of the cap member engaging at least a portion of the continuous threads which extend about the periphery of the bolt head, the end of the sidewall of the cap member is positioned against the structure.

11. The cap system of claim 10, wherein with the bolt head in the secured position with respect to the structure, a washer is positioned between the bolt head and the structure.

12. A cap system for enclosing a metallic bolt fastener extending through a structure, comprising:
a first securement mechanism positioned about the periphery of a bolt head of the metallic bolt fastener comprises a plurality of grooves positioned spaced apart about the periphery of the bolt head; and
a cap member comprising a sidewall, having:
an inner surface which defines a cavity dimensioned to receive the bolt head, and defines a second securement mechanism which comprises at least one annular ledge positioned along the inner surface of the cap member; and
an end of the sidewall of the cap member defines an opening which provides the bolt head access to the cavity.

13. The cap system of claim 12, wherein:
the plurality of grooves are defined by a plurality of ridge members which extend in a radial direction away from the bolt head;
adjacent ridge members are equally spaced apart about the bolt head; and
a portion of the plurality of grooves are positioned on each ridge member spaced apart from one another and aligned in a row.

14. The cap system of claim 13, wherein the at least one annular ledge is positioned spaced apart from the end of the cap member such that with the bolt head in a secured position with respect to the structure and with the at least one annular ledge engaging at least one of the plurality of grooves the end of the sidewall of the cap member is positioned against the structure.

15. The cap system of claim 14, wherein with the bolt head in the secured position with respect to the structure, a washer is positioned between the bolt head and the structure.

16. The cap system of claim 12, wherein the end of the sidewall of the cap member defines one of:
a continuous annular flat surface; or
a groove which extends about the cap member, wherein:
a first opening defined by and extends through a first portion of the sidewall of the cap member wherein the first opening communicates with the groove such that a first flow path extends through the first opening and into the groove for conveyance of a sealant; and
a second opening defined by and extends through the first portion of the sidewall of the cap member and spaced apart about the cap member from the first opening wherein the second opening communicates with the groove such that a second flow path extends from the groove through the second opening of the cap member for conveyance of sealant; or
a third opening defined by and extends through a first portion of the sidewall of the cap member wherein the third opening communicates with the groove such that a first flow path extends through the first portion of the sidewall of the cap member and into the groove for conveyance of sealant;
a fourth opening defined by and extends through as second portion of the sidewall of the cap member wherein the fourth opening communicates with the groove and the fourth opening communicates with the cavity of the cap member such that a second flow path extends from the groove, through the fourth opening and into the cavity; and
a fifth opening defined by and extends through the sidewall of the cap member wherein the fifth opening provides a third flow path from the cavity of the cap member through the fifth opening.

17. A cap system for enclosing a metallic bolt fastener extending through a structure, comprising:
a first securement mechanism which comprises a plurality of continuous grooves which extend about the periphery of a bolt head of the metallic bolt fastener; and
a cap member comprising a sidewall, having:
an inner surface which defines a cavity dimensioned to receive the bolt head and defines a second securement mechanism which comprises a plurality of teeth positioned along the inner surface of the cap member; and
an end of the sidewall of the cap member which defines an opening which provides the bolt head access to the cavity.

18. The cap system of claim 17, wherein the plurality of teeth are positioned extending in a direction away from the end of the cap member such that with the bolt head in a secured position with respect to the structure and with at least a portion of the plurality of teeth engaging at least a portion of the plurality of continuous grooves the end of the sidewall of the cap member is positioned against the structure.

19. The cap system of claim 18, wherein with the bolt head in the secured position with respect to the structure, a washer is positioned between the bolt head and the structure.

20. The cap system of claim 17, wherein the end of the sidewall of the cap member defines one of:
- a continuous annular flat surface; or
- a groove which extends about the cap member, wherein:
  - a first opening defined by and extends through a first portion of the sidewall of the cap member wherein the first opening communicates with the groove such that a first flow path extends through the first opening and into the groove for conveyance of a sealant; and
  - a second opening defined by and extends through the first portion of the sidewall of the cap member and spaced apart about the cap member from the first opening wherein the second opening communicates with the groove such that a second flow path extends from the groove through the second opening of the cap member for conveyance of sealant.

* * * * *